United States Patent
Gooden et al.

(10) Patent No.: US 9,080,607 B2
(45) Date of Patent: Jul. 14, 2015

(54) THRUST BEARING SNAP RING RETAINER

(71) Applicant: FORD GLOBAL TECHNOLOGIES, LLC, Dearborn, MI (US)

(72) Inventors: James T. Gooden, Canton, MI (US); Troy Smith, Milford, MI (US); Bradley R. Heuver, South Lyon, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 155 days.

(21) Appl. No.: 13/950,571

(22) Filed: Jul. 25, 2013

(65) Prior Publication Data

US 2015/0030279 A1  Jan. 29, 2015

(51) Int. Cl.
*F16C 35/07* (2006.01)
*F16C 33/58* (2006.01)

(52) U.S. Cl.
CPC .............. *F16C 35/07* (2013.01); *F16C 33/586* (2013.01)

(58) Field of Classification Search
CPC ...... F16C 19/305; F16C 33/58; F16C 33/586; F16C 33/588; F16C 35/07; F16B 21/18; F16B 21/183; F16B 21/186
See application file for complete search history.

(56) References Cited

U.S. PATENT DOCUMENTS

| | | | |
|---|---|---|---|
| 5,413,418 | A | 5/1995 | Lee |
| 5,746,517 | A * | 5/1998 | Durham et al. ............... 384/538 |
| 5,927,868 | A | 7/1999 | Critchley et al. |
| 5,967,673 | A | 10/1999 | Kenney, Jr. et al. |
| 6,036,373 | A | 3/2000 | Faass et al. |
| 6,394,660 | B1 | 5/2002 | Butler, III et al. |
| 6,533,461 | B2 | 3/2003 | Gottlieb |
| 7,073,951 | B2 | 7/2006 | Axler et al. |
| RE40,313 | E | 5/2008 | Axler et al. |
| 8,408,805 | B2 | 4/2013 | Winkler et al. |

* cited by examiner

*Primary Examiner* — Thomas R. Hannon
(74) *Attorney, Agent, or Firm* — James Dottavio; MacMillan, Sobanski & Todd, LLC

(57) ABSTRACT

An assembly includes a rotatable member formed with a recess, a first component, a snap ring located in the recess for limiting axial displacement of the first component, and a bearing located between the first component and a second component, including a finger extending from a race of the bearing toward the bearing and able to limit radial movement of the snap ring.

16 Claims, 4 Drawing Sheets

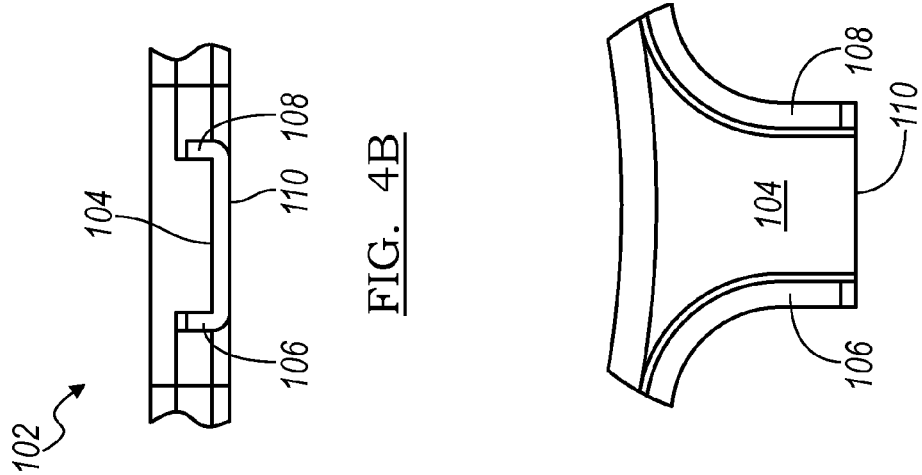
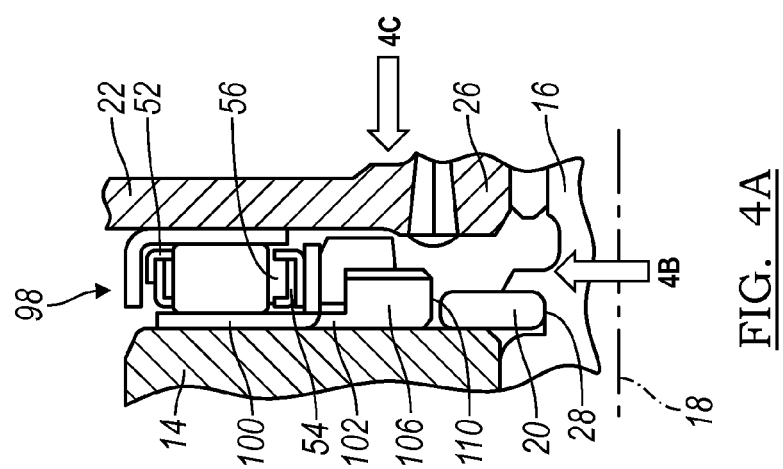
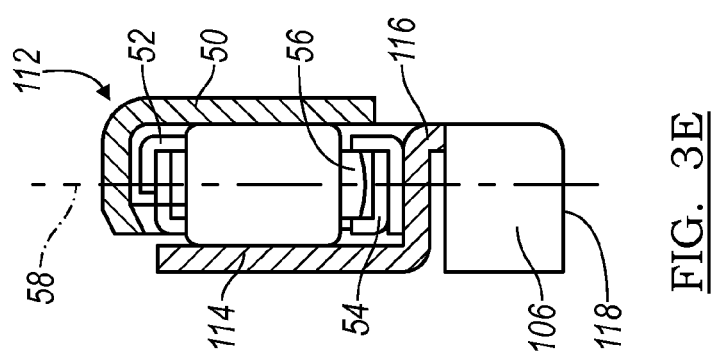

THRUST BEARING SNAP RING RETAINER

BACKGROUND OF THE INVENTION

1. Field of the Invention

This invention relates generally to an apparatus for retaining a snap ring in a groove formed in a rotating component having a speed that causes the snap ring to expand radially due to centrifugal force.

2. Description of the Prior Art

External snap rings attached to the exterior of rotating shafts and hubs tend to expand radially when rotating at high speeds, due to centrifugal force on the snap ring.

An easy way to hold snap rings in place is to have a step in the adjacent part that would wrap around the outer diameter of the snap ring, retaining it in place where the snap ring can't grow larger than the engagement groove when spinning fast. This approach requires that the part having the step can be pushed away from the snap ring so that the snap ring can be installed and retained part slid back. A clutch piston depressed against its return spring is an example of this approach.

When retaining a hub to a shaft, it normally will push against a hard stop, not a spring, thereby producing an installation problem when a snap ring is needed to hold the hub in place axially.

A potential solution, involves adding a second part, e.g., a loose L-shaped washer that gets pinched in place and has similar features to retain the snap ring, also requires ability to move the retained part beyond its normal location so that the snap ring can be installed.

SUMMARY OF THE INVENTION

An assembly includes a rotatable member formed with a recess, a first component, a snap ring located in the recess for limiting axial displacement of the first component, and a bearing located between the first component and a second component, including fingers extending from a race of the bearing toward the bearing and able to limit radial movement of the snap ring.

Little or no cost is added to the bearing due to the fingers being formed from material that would conventionally be scrapped after forming a bearing race without the fingers. The assembly includes no additional parts and no additional package space as compared to a conventional assembly.

The fingers key into the first component, assuring no relative motion between that bearing race and the first component, minimizing risk of wear between those parts when the bearing is not under axial load. As long as the fingers are asymmetric, they also provide the function of preventing the bearing from being installed upside down in the transmission.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIGS. 3A-3E are each a side view of an alternate thrust bearing for the assembly;

FIG. 4A is a side of the assembly having an alternate bearing; and

FIGS. 4B and 4C are alternate views of the bearing of FIGS. 4A and 3E.

DESCRIPTION OF THE PREFERRED EMBODIMENT

Figure 1:
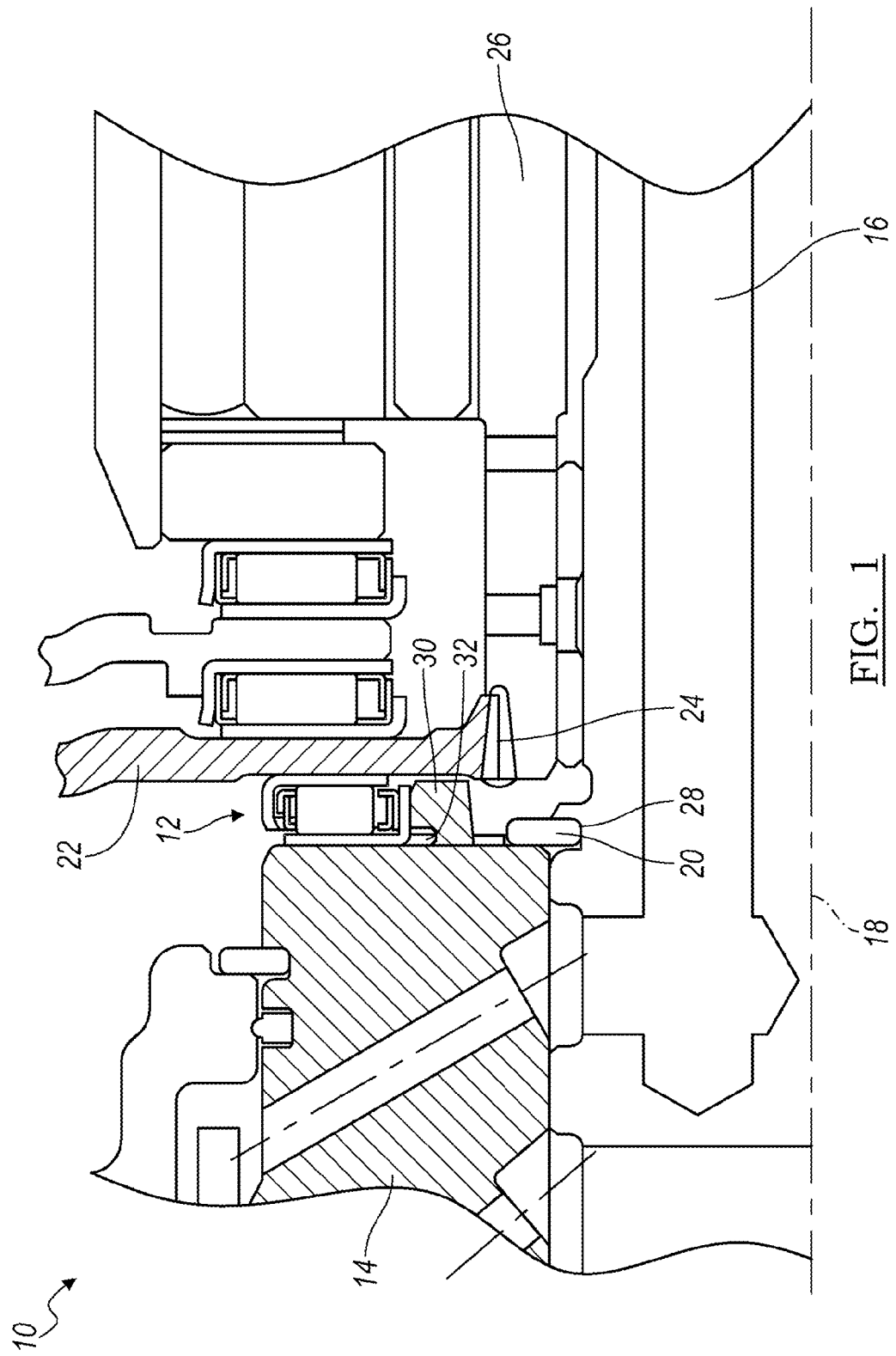
FIG. 1 is a cross sectional side view of an assembly that includes a snap ring, thrust washer and thrust bearing.

Referring now to of FIG. 1, wherein an assembly 10 includes a thrust bearing 12, a first component, such as a clutch hub 14; a shaft 16 supported for rotation about an axis 18; a snap ring 20; and a second component 22, secured by a weld 24 to a second shaft 26. Snap ring 20 is fitted in an annular recess 28 formed in the radial outer surface of shaft 16. The thrust bearing 12 permits rotation of component 14 relative to component 22 and transmits axially-directed force between components 14 and 22. Shaft 16 and snap ring 20 rotate about axis 18 at high speed, which may be about 7000 rpm.

Component 14 is formed with an axial extensions 30, spaced mutually at equal angular intervals about axis 18, the extensions 30 provides a radial pilot surface for locating the thrust bearing 12.

Thrust bearing 12 preferably includes three tabs or fingers 32, each finger spaced mutually at equal angular intervals about axis 18 and extending toward the snap ring 20. The fingers are easy to make and use material of the bearing that would have been scrapped when forming this race if the tabs were not used in the assembly 10.

Radial contact between the radial inner end of the fingers and the outer radial surface of the snap ring 20 prevents the snap ring from moving radially outward from its recess 28 due to centrifugal force.

Angular contact between the fingers 30 and the extensions 32 prevents rotation of the thrust bearing 12 relative to component 14.

Figure 2:
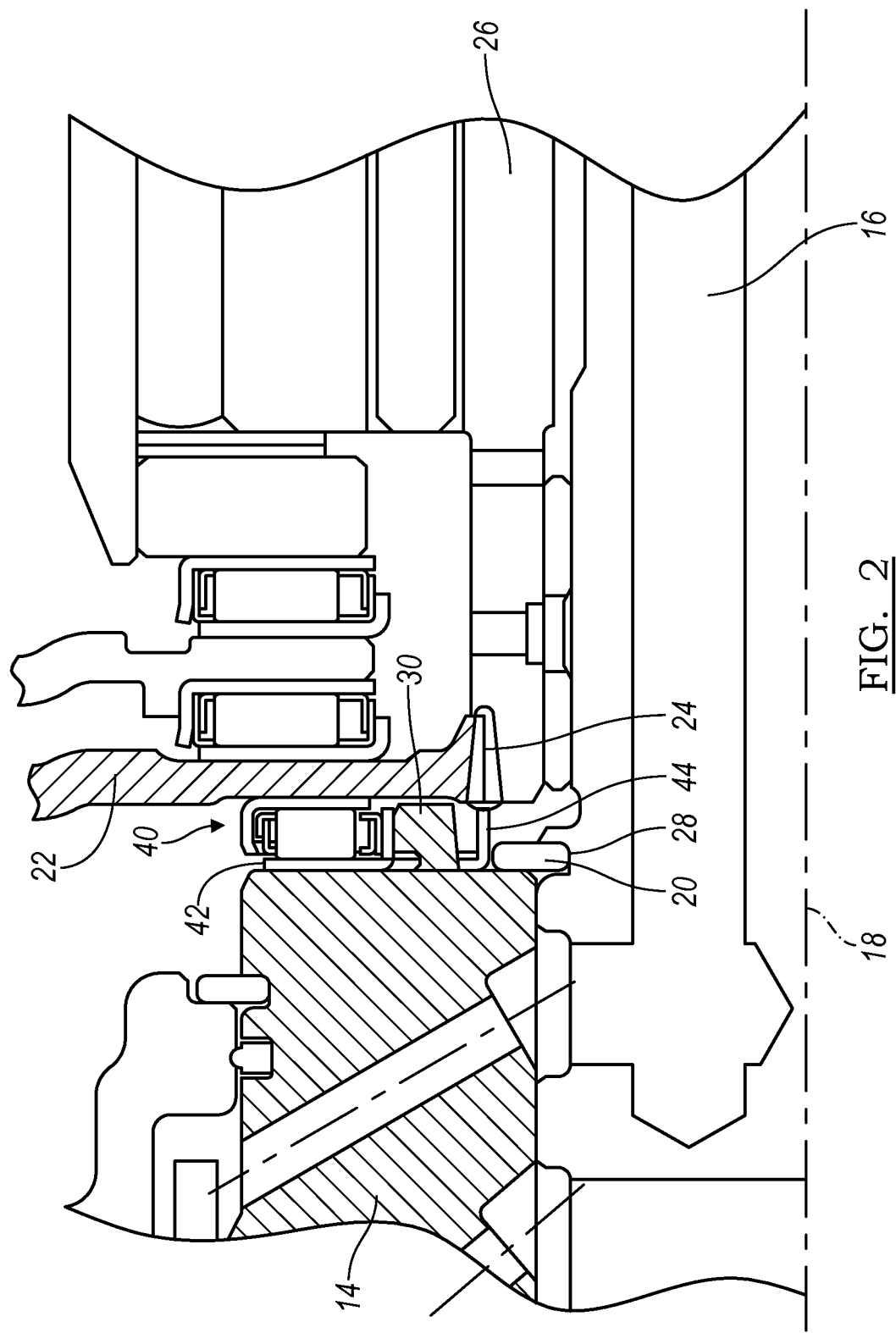
FIG. 2 illustrates an alternate thrust bearing 40 in the assembly of FIG. 1.

FIG. 2 illustrates an alternate thrust bearing 40, which includes an L-shaped race 42 having legs 44 directed axially to provide greater axial length above the snap ring 20 to prevent the snap ring from moving radially outward from its recess 28 due to centrifugal force and retaining the snap ring in its correct location.

FIGS. 3A-3D illustrate alternate thrust bearings for use in the assembly 10. Bearing 46 includes races 48, 50, surrounding cage members 52, 54, which cage contains a series of annularly-spaced rotating members 56 supported for rotation about an axis 58. Race 48 includes angularly-spaced fingers 62, each finger is spaced mutually at equal angular intervals about axis 18. Each finger 62 is formed with a radially-directed portion located at a different axial position from the position of fingers 30 of FIG. 1, and an axial portion 64.

Radial contact between the radial surface 66 of fingers 62 and the outer radial surface of the snap ring 20 prevents the snap ring from moving radially outward from its recess 28 due to centrifugal force. Angular contact between fingers 62 and the extensions 32 prevents rotation of the thrust bearing 12 relative to component 14. Furthermore, the axial location of radial portions 62 indicates to the installer that the bearing is correctly installed if its radial portions 62 key into component 14.

Figure 3D:
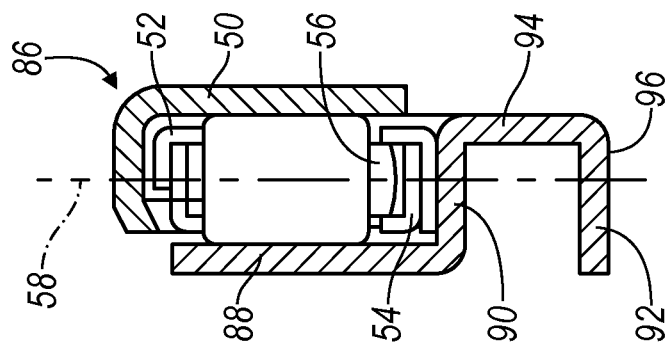
Figure 3C:
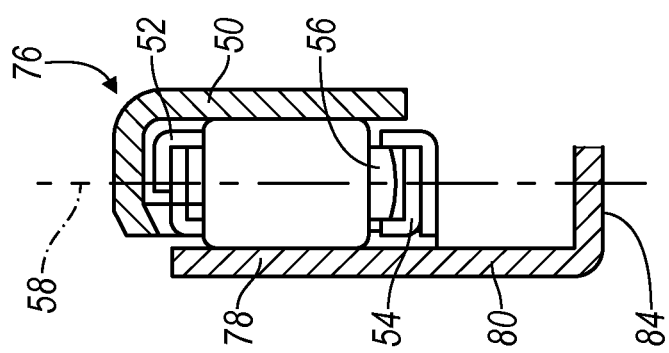
Figure 3B:
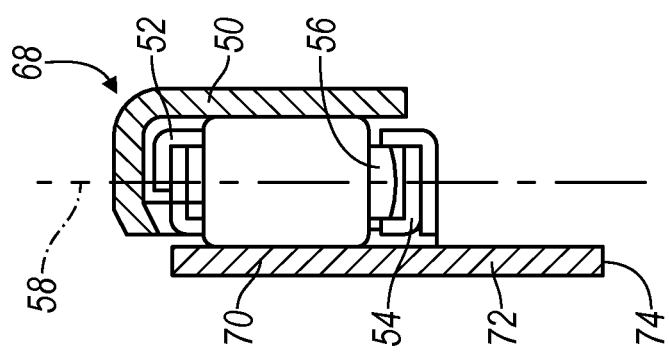
Figure 3A:
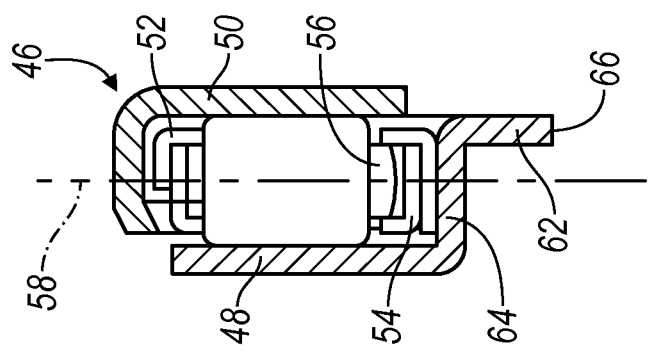

Bearing 68 of FIG. 3B includes a race 70 formed with radial fingers 72, each finger spaced mutually at equal angular intervals about axis 18. Radial contact between the radial surface 74 of fingers 72 and the outer radial surface of the snap ring 20 prevents the snap ring from moving radially outward from its recess 28 due to centrifugal force.

Bearing 76 of FIG. 3C includes a race 78 formed with L-shaped fingers 80, each finger spaced mutually at equal angular intervals about axis 18. Each finger 80 includes an axially-directed leg to provide greater axial length above the snap ring 20 to prevent the snap ring from moving radially outward from its recess 28. Radial contact between the radial surface 84 of fingers 80 and the outer radial surface of the snap ring 20 prevents the snap ring from moving radially outward from its recess 28 due to centrifugal force.

Bearing 86 of FIG. 3D includes a race 88 formed with fingers 90, each finger spaced mutually at equal angular intervals about axis 18. Each finger 90 includes an axially-directed portion 92 depending to a radially-directed portion 94. Radial contact between the axial surface 96 of portion 92 and the outer radial surface of the snap ring 20 prevents the snap ring from moving radially outward from its recess 28 due to centrifugal force.

Bearing 98 of FIGS. 4A-4C includes a race 100 formed with U-shaped fingers 102, each finger spaced mutually at equal angular intervals about axis 18. Each finger 102 includes a web 104 connecting axially-directed legs 106, 108 having concave outer surfaces. Bearing 98 provides extra length for retaining the snap ring 20 in its recess 28. Radial contact between the radial surface 110 of fingers 102 and the outer radial surface of the snap ring 20 prevents the snap ring from moving radially outward from its recess 28 due to centrifugal force.

Bearing 112 of FIG. 3E includes a race 114 formed with U-shaped fingers 116 folded in the opposite axial direction from the fingers 102 of FIGS. 4A-4C. Each finger 116 is spaced mutually at equal angular intervals about axis 18. Each finger 116 includes the web 104 connecting axially-directed legs 106, 108 having concave outer surfaces. Radial contact between the radial surface 118 of fingers 116 and the outer radial surface of the snap ring 20 prevents the snap ring from moving radially outward from its recess 28 due to centrifugal force.

In accordance with the provisions of the patent statutes, the preferred embodiment has been described. However, it should be noted that the alternate embodiments can be practiced otherwise than as specifically illustrated and described.

The invention claimed is:

1. An assembly, comprising:
   a rotatable member formed with a recess;
   a first component;
   a snap ring located in the recess for limiting axial displacement of the first component;
   a bearing located between the first component and a second component, including a finger extending from a race of the bearing toward the snap ring and able to limit radial movement of the snap ring.

2. The assembly of claim 1, wherein the bearing is a thrust bearing that permits rotation of the first component relative to the second component and is able to transmit axially-directed force between the first and second components.

3. The assembly of claim 1, wherein the finger includes a surface located for contact with the snap ring, said contact limiting radial movement of the snap ring relative to the recess.

4. The assembly of claim 1, wherein the finger includes a radial portion directed toward the bearing, and an axial leg facing the bearing and formed with a surface located for contact with the snap ring, said contact limiting radial movement of the snap ring relative to the recess.

5. The assembly of claim 1, wherein the finger includes:
   a radial portion directed toward the bearing;
   an axially-directed portion connected to the radial portion; and
   a radial portion connected to the axially-directed portion and formed with a surface located for contact with the snap ring, said contact limiting radial movement of the snap ring relative to the recess.

6. The assembly of claim 1, wherein the finger includes:
   a radial portion directed toward the bearing;
   an axially-directed portion connected to the radial portion;
   a second radial portion connected to the axially-directed portion and directed toward the bearing; and
   a second axially-directed portion connected to the second radial portion and formed with a surface located for contact with the snap ring, said contact limiting radial movement of the snap ring relative to the recess.

7. The assembly of claim 1, wherein the finger includes:
   a radial portion directed toward the bearing;
   an axially-directed U-shaped portion connected to the radial portion, including a web connected to legs that define a surface contactable by the snap ring, said contact limiting radial movement of the snap ring relative to the recess.

8. The assembly of claim 1, wherein the first component includes a projection that is located for contact with the finger, said contact preventing rotation of the bearing.

9. An assembly, comprising:
   a rotatable member formed with a recess;
   a snap ring located in the recess for limiting axial displacement of a first component;
   a bearing located between the first component and a second component, including a race formed with fingers spaced about an axis and extending toward the bearing, the fingers being able to limit radial movement of the snap ring.

10. The assembly of claim 9, wherein the first component includes a projection that is located for contact with at least one of the fingers, said contact preventing rotation of the bearing.

11. The assembly of claim 9, wherein the bearing is a thrust bearing that permits rotation of the first component relative to the second component and is able to transmit axially-directed force between the first and second components.

12. The assembly of claim 9, wherein each of the fingers includes a surface located for contact with the snap ring, said contact limiting radial movement of the snap ring relative to the recess.

13. The assembly of claim 9, wherein each of the fingers includes a radial portion directed toward the bearing, and an axial leg facing the bearing and formed with a surface located for contact with the snap ring, said contact limiting radial movement of the snap ring relative to the recess.

14. The assembly of claim 9, wherein each of the fingers includes:
   a radial portion directed toward the bearing;
   an axially-directed portion connected to the radial portion; and
   a radial portion connected to the axially-directed portion and formed with a surface located for contact with the snap ring, said contact limiting radial movement of the snap ring relative to the recess.

15. The assembly of claim 9, wherein each of the fingers includes:

a radial portion directed toward the bearing;
an axially-directed portion connected to the radial portion;
a second radial portion connected to the axially-directed portion and directed toward the bearing; and
a second axially-directed portion connected to the second radial portion and formed with a surface located for contact with the snap ring, said contact limiting radial movement of the snap ring relative to the recess.

16. The assembly of claim 9, wherein each of the fingers includes:
a radial portion directed toward the bearing;
an axially-directed U-shaped portion connected to the radial portion, including a web connected to legs that define a surface located for contact with the snap ring, said contact limiting radial movement of the snap ring relative to the recess.

\* \* \* \* \*